US007543218B2

(12) United States Patent
Chung

(10) Patent No.: US 7,543,218 B2
(45) Date of Patent: Jun. 2, 2009

(54) DVD DECODING METHOD AND APPARATUS USING SELECTIVE PO-CORRECTION

(75) Inventor: Seung-Jae Chung, Suwon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 525 days.

(21) Appl. No.: 10/948,219

(22) Filed: Sep. 24, 2004

(65) Prior Publication Data

US 2005/0193289 A1 Sep. 1, 2005

(30) Foreign Application Priority Data

Jan. 31, 2004 (KR) .................... 10-2004-0006466

(51) Int. Cl.
*G11C 29/00* (2006.01)
(52) U.S. Cl. ...................... 714/769; 714/763
(58) Field of Classification Search ................ 714/769, 714/804, 763
See application file for complete search history.

(56) References Cited

U.S. PATENT DOCUMENTS

| | | | | |
|---|---|---|---|---|
| 4,653,051 A | * | 3/1987 | Sugimura et al. | 714/755 |
| 4,852,099 A | * | 7/1989 | Ozaki | 714/756 |
| 5,450,421 A | * | 9/1995 | Joo et al. | 714/756 |
| 5,731,922 A | * | 3/1998 | Yamasaki et al. | 360/53 |
| 5,757,824 A | | 5/1998 | Arai et al. | |
| 5,903,410 A | * | 5/1999 | Blaum et al. | 360/77.08 |
| 5,917,836 A | | 6/1999 | Ichikawa et al. | |
| 5,920,578 A | * | 7/1999 | Zook | 714/755 |
| 6,115,837 A | * | 9/2000 | Nguyen et al. | 714/769 |
| 6,415,411 B1 | * | 7/2002 | Nakamura | 714/755 |
| 6,430,723 B2 | * | 8/2002 | Kodama et al. | 714/770 |
| 6,466,733 B1 | * | 10/2002 | Kim | 386/68 |
| 6,470,473 B1 | | 10/2002 | Iwasa | 714/785 |
| 6,718,506 B1 | * | 4/2004 | Sebastian et al. | 714/763 |
| 2002/0062469 A1 | * | 5/2002 | Shieh et al. | 714/758 |
| 2002/0073376 A1 | * | 6/2002 | Otake et al. | 714/758 |
| 2002/0133779 A1 | * | 9/2002 | Shieh | 714/755 |
| 2004/0015769 A1 | * | 1/2004 | Nagai et al. | 714/758 |

FOREIGN PATENT DOCUMENTS

KR 2001-0083258 9/2001

OTHER PUBLICATIONS

Korean Patent Office Action dated Apr. 27, 2006.
Taiwanese Preliminary Notice of First Office Action, and its English translation, (dated Jun. 9, 2008) for counterpart Taiwanese Patent Application No. 094101632 is provided for the purposes of certification under 37 C.F.R. §§ 1.97(e) and 1.704(d).

* cited by examiner

*Primary Examiner*—Mujtaba K Chaudry
(74) *Attorney, Agent, or Firm*—Harness, Dickey & Pierce, P.L.C.

(57) ABSTRACT

A method of decoding DVD-format data may include: receiving a demodulated error correction code (ECC) block of DVD-format data; parity-of-inner-code-correcting (PI-correcting) the demodulated ECC block as needed; identifying any errant column within the PI-corrected block which merits PO-correction; and selectively PO-correcting only the errant PI-corrected columns to obtain a decoded version of ECC block.

36 Claims, 6 Drawing Sheets

DVD DECODING METHOD AND APPARATUS USING SELECTIVE PO-CORRECTION

CROSS-REFERENCE TO RELATED APPLICATIONS

This U.S. non-provisional patent application claims priority under 35 U.S.C. §119 of Korean Patent Application 2004-0006466 filed on Jan. 31, 2004, the entire contents of which are hereby incorporated by reference.

BACKGROUND OF THE INVENTION

A digital video signal stored on a DVD-ROM (digital versatile disk-read only memory) is arranged as blocks of ECC (error correcting code) data. As depicted in FIG. 1 according to the Background Art, an ECC block 100 includes 2048 scrambled user-data bytes treated as an array having 192 rows and 172 columns (where each column is one byte wide) of main data 102. The ECC-encodation of the user-data widens each of the 192 rows by adding 10 bytes of PI (parity inner code) data 104 and lengthens each of the 172 columns by adding 16 rows of PO (parity outer code) data 106.

FIG. 2 is a block diagram of a DVD-device (player/recorder) 202 according to the Background Art. DVD-device 202 includes an ECC decoder 204 and a first memory 206 external to ECC decoder 204. Hereafter, memory 206 will be referred to as external memory 206. ECC decoder 204 includes: a demodulator 208; an ECC engine 210; and a second memory 212 (hereafter referred to as internal memory 212 because it is internal to ECC decoder 204). ECC engine 210 includes: PI-syndrome generator 214; and PO-syndrome generator 216. As is known, a syndrome is a product of a matrix multiplication, which is used to identify which of several potentially-noise-corrupted candidate pieces of data represents the true data. More particularly, a syndrome is the product of a parity check matrix multiplied by a vector of candidate data.

Demodulator 208 reads and demodulates blocks of ECC data from a DVD 200, and stores the demodulated ECC blocks in external memory 204. A more primitive, older version of DVD-device 202 decoded an ECC block via ECC engine 210 as follows: (1) generate the PI-syndrome via PI-syndrome generator 214; (2) temporarily store the PI-syndrome and the ECC block in internal memory 212; (3) perform PI-correction upon the entire ECC block; (4) overwrite, in internal memory 212, the entire ECC block with entire PI-corrected block; (5) generate the PO-syndrome via PO-syndrome generator 216; (6) temporarily store the PO-syndrome in internal memory 212; (7) perform PO-correction upon the entire PI-corrected block; and (7) store the PO-corrected block in external memory 204. The PO-corrected block represents the decoded DVD data, which can be output from external memory 206 to a host.

The older version of DVD-device 202 had an advantage of only requiring a single ECC engine 210. But it had a greater disadvantage that it required a large internal memory 212 (e.g., 40 k bytes SRAM) in order to temporarily store the PI-corrected block. As the size of internal memory 212 represents a significant portion of the total cost of DVD-device 202, efforts were made to reduce the size of internal memory 212.

It was recognized that decoding could be performed with adequate speed if (1) only the PO-syndrome was stored in internal memory 212 while the PI-corrected block was stored in external memory 206, and (2) a second ECC engine was provided. This conferred the benefit of significantly reducing the size of internal memory 212 down to 6 k bytes. The second ECC engine makes it possible to generate a PO-syndrome for block(k) in parallel with PO-correcting block(k−1).

SUMMARY OF THE INVENTION

At least one embodiment of the present invention provides a method of decoding DVD-format data. Such a method may include: receiving a demodulated error correction code (ECC) block of DVD-format data; parity-of-inner-code-correcting (PI-correcting) the demodulated ECC block as needed; identifying any errant column within the PI-corrected block which merits PO-correction; and selectively PO-correcting only the errant PI-corrected columns to obtain a decoded version of ECC block.

At least one other embodiment of the present invention provides an apparatus for decoding DVD-format data. Such an apparatus may include: an external memory in which is stored a demodulated error correction code (ECC) block of DVD-format data; an ECC engine to parity-of-inner-code-correct (PI-correct) the demodulated ECC block as needed; and parity-of-outer code decision (PO-decision) logic to indicate any errant column within the PI-corrected block which merits PO-correction, and to selectively cause the ECC engine to PO-correct only the errant PI-corrected columns in order to obtain a decoded version of ECC block.

Additional features and advantages of the invention will be more fully apparent from the following detailed description of example embodiments, the accompanying drawings and the associated claims.

BRIEF DESCRIPTION OF THE DRAWINGS

The present invention will be described more fully with reference to the accompanying drawings, of which those not labeled "Background Art" depict example embodiments of the present invention.

It should be understood that example embodiments of the present invention described herein can be modified in form and detail without departing from the spirit and scope of the invention. Accordingly, the embodiments described herein are provided by way of example and not of limitation, and the scope of the present invention is not restricted to the particular embodiments described herein.

DETAILED DESCRIPTION OF EXAMPLE EMBODIMENTS

In developing the present invention, the following problem with the Background Art was recognized and a path to a solution identified. The Background Art DVD-device 202 performs PO-correction upon every column of the PI-corrected block. But not every column of the PI-corrected block has errors that need to be corrected. This wastes processing bandwidth, increases the total time needed to decode, and increases the size of the internal memory. Such problems could be mitigated if the errant columns in the PI-corrected block could be identified and only the errant columns corrected. At least one embodiment of the present invention provides a method of decoding DVD-format data that selectively PO-corrects only the errant PI-corrected columns to obtain a decoded version of ECC'd block.

Figure 1:
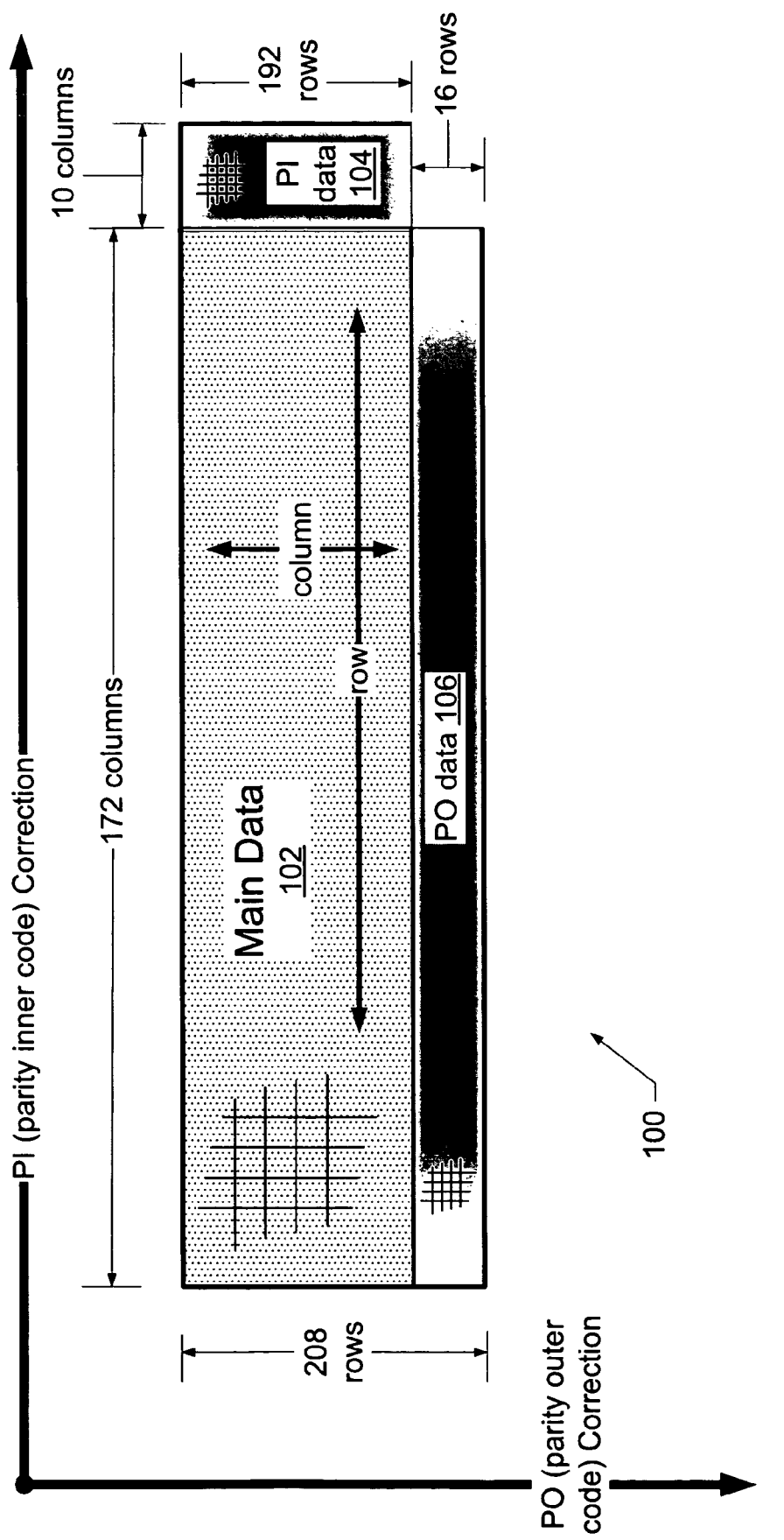
FIG. 1 is a block diagram of a digital video signal stored on a DVD-ROM (digital versatile disk-read only memory) and arranged as blocks of ECC data, according to the Background Art.
Figure 2:
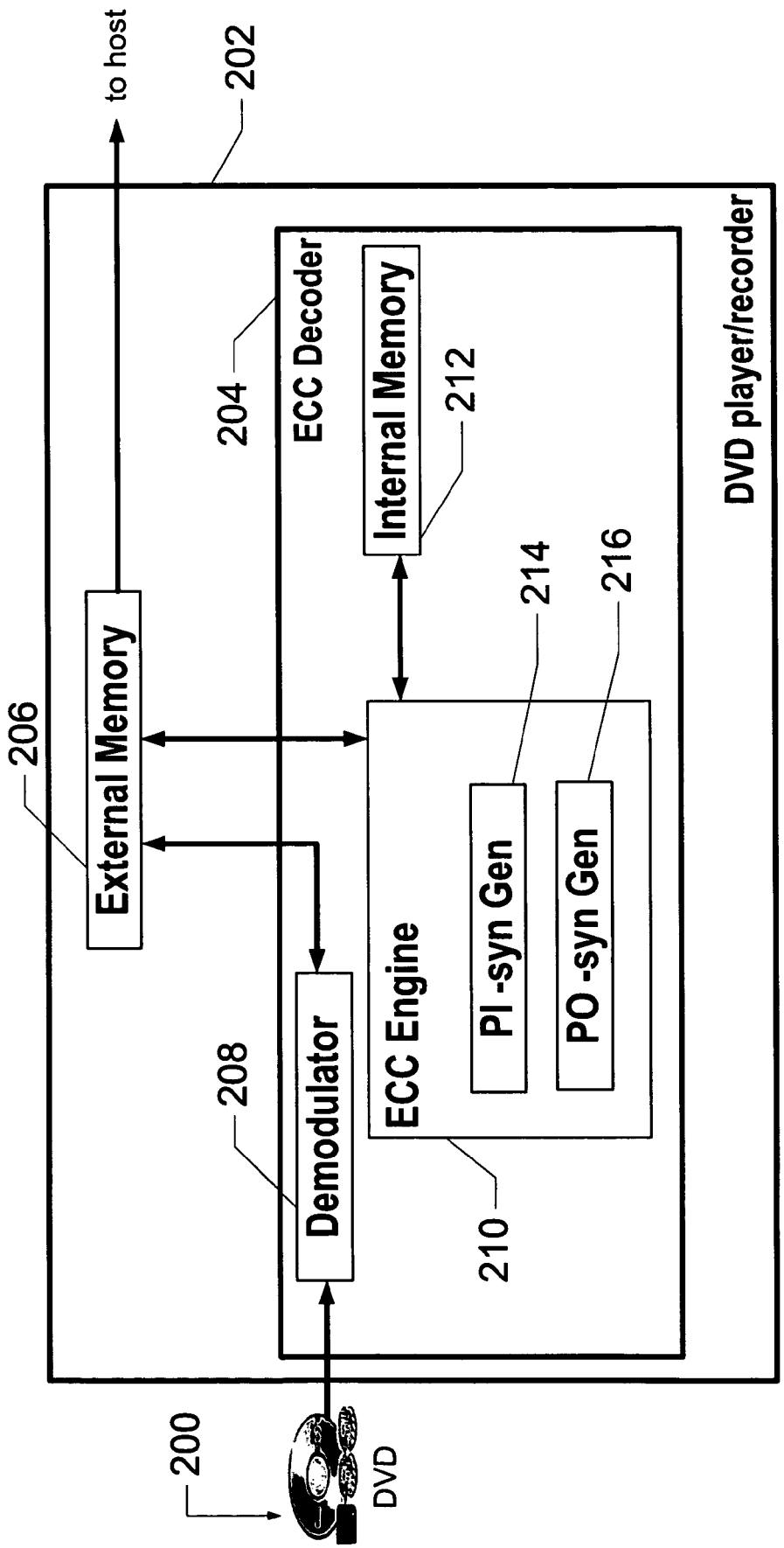
FIG. 2 is a block diagram of a DVD-device (player/recorder), according to the Background Art.
Figure 3A:
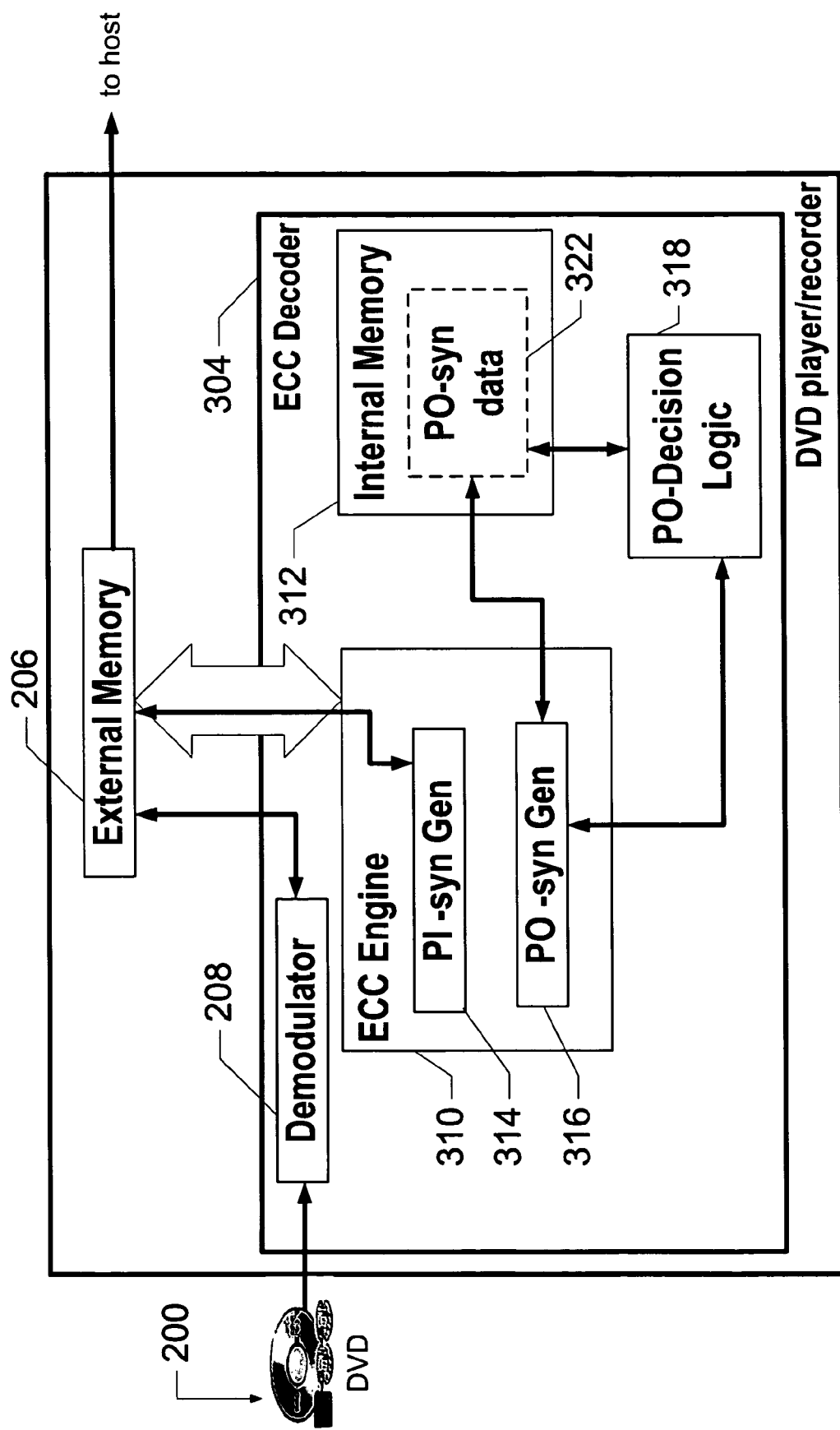
FIG. 3A is a block diagram of a DVD-device 302, according to at least one embodiment of the present invention.

FIG. 3A is a block diagram of a DVD-device 302, according to at least one embodiment of the present invention. DVD-device 302 includes an ECC decoder 304 and a first memory 206, e.g., SDRAM, external to ECC decoder 304. Hereafter, memory 306 will be referred to as external memory 306. ECC decoder 304 includes: a demodulator 208; an ECC engine 310; and a second memory 312 (hereafter referred to as internal memory 312 because it is internal to ECC decoder 304), e.g., SRAM. ECC engine 310 includes: PI-syndrome (where, again, PI is an acronym for the term parity inner) generator 314; PO-syndrome generator 316 (where, again, PO is an acronym for the term parity outer); and PO-decision logic 318.

ECC engine 310 performs PI-correction before performing PO-correction. Both types of correction are facilitated via the calculation of a PI-syndrome and a PO-syndrome, respectively. Again, a syndrome is a product of a matrix multiplication, which is used to identify which of several potentially-noise-corrupted candidate pieces of data represents the true data. More particularly, a syndrome is the product of a parity check matrix multiplied by a vector of candidate data.

PO-decision logic 318 can operate on the PO-syndrome to indicate to ECC engine 310 which columns within the PI-corrected block are errant and should receive PO-correction. Then ECC engine 310 can selectively PO-correct only the errant PI-corrected columns to obtain a decoded version of ECC'd block.

Figure 3B:
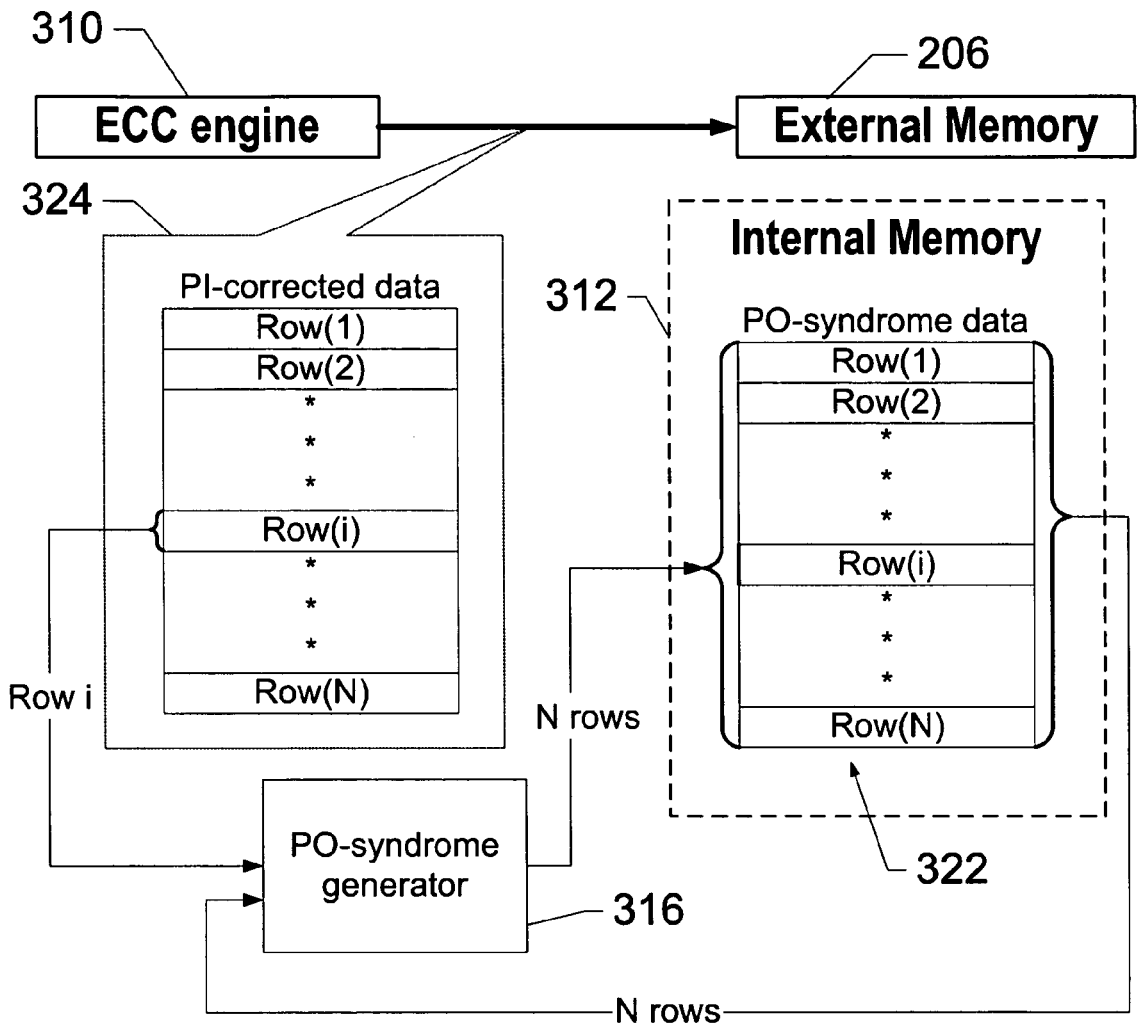
FIG. 3B is a block diagram variation of FIG. 3A, and as such is a block diagram of a DVD-device 302, according to at least one embodiment of the present invention.

FIG. 3B is a block diagram variation of FIG. 3A, which is simplified in some respects relative thereto and more-detailed in some respects relative thereto. As such, FIG. 3B is a block diagram of a DVD-device 302, according to at least one embodiment of the present invention.

At an intermediary point in the decoding of the DVD data, an output of ECC engine 310 is a PI-corrected block that is a version of a corresponding demodulated ECC block previously stored in external memory 206 by demodulator 208. But, as will be described in more detail below, ECC engine 310 produces the PI-corrected block 324 on a row-by-row basis. For the purposes of simplifying illustration, however, the output of ECC engine 310 is depicted in FIG. 3B as PI-corrected block 324 in array form. The row-by-row manner by which ECC engine 310 operates to produce PI-corrected block 324 is depicted via the bracket next to row(i).

FIG. 3B also depicts PO-syndrome data 322 (in internal memory 312) as being treated as an array having N rows and M columns, e.g., N=16 and M=182. As will be discussed further below, for each row(i) of PI-corrected block 324 that is produced by ECC engine 310, PO-syndrome generator 316 iteratively generates all N-rows of PO-syndrome data 322. Accordingly, for each such iteration, PO-syndrome generator 316 receives a row of PI-corrected block 324 and all N-rows of the previous iteration of PO-syndrome data 322 (also to be discussed in more detail below).

Figure 4:
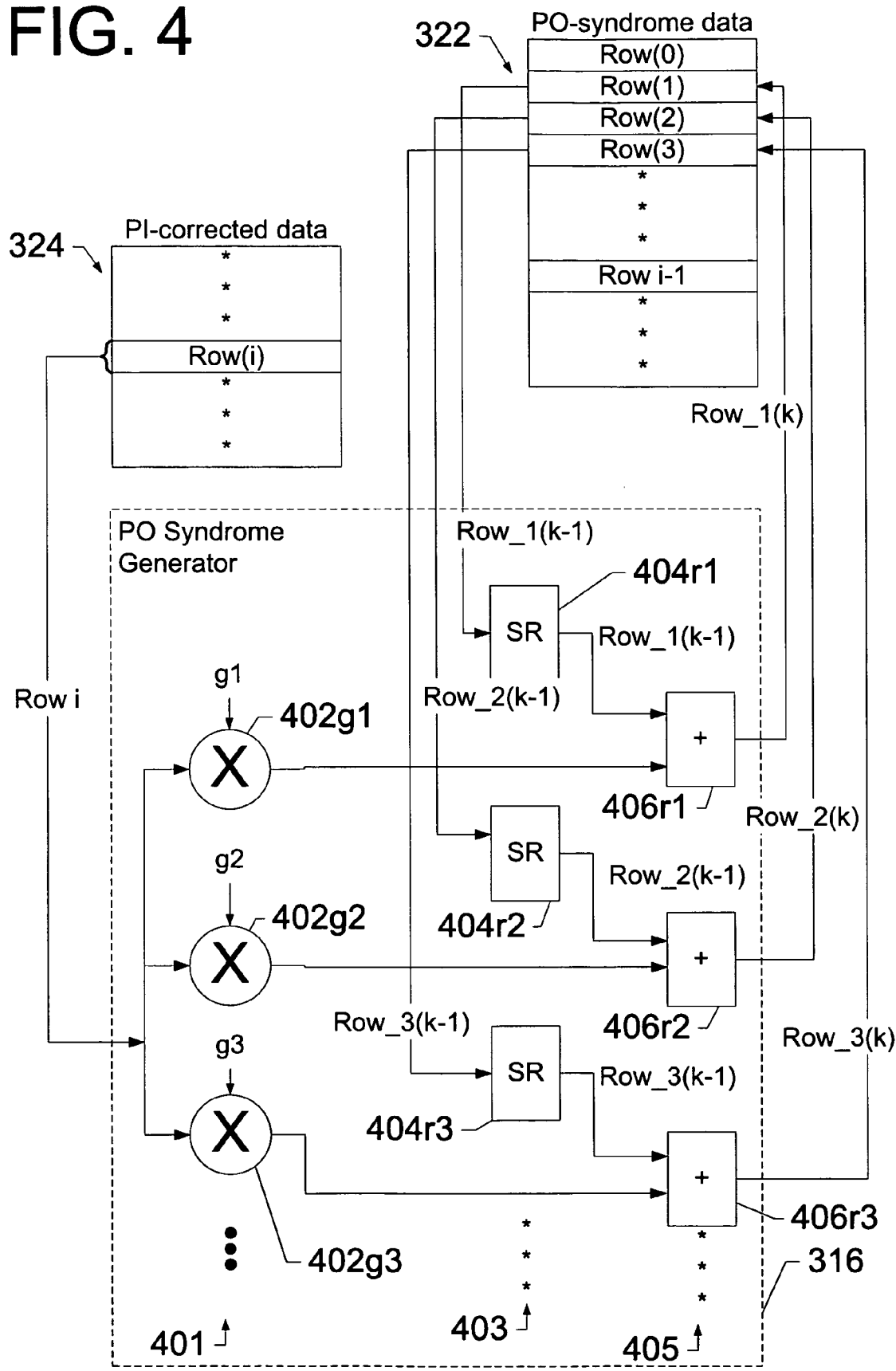
FIG. 4 is a more detailed block diagram of the PO-syndrome generator of FIG. 3A, according to at least one embodiment of the present invention.

FIG. 4 is a more detailed block diagram of PO-syndrome generator 316, according to at least one embodiment of the present invention. FIG. 4 is simplified in some respects relative to FIG. 3B, and more-detailed in some respects relative thereto.

In FIG. 4, PO-syndrome generator 316 is depicted as including: a bank of multipliers 401; a bank of shift registers 403; and a bank of adders 405. Bank 401 includes multipliers $402g1, 402g2, 402g3, \ldots, 402g(N)$ for multiplying row(i) of PI-corrected block 324 with a set of coefficients, e.g., for performing a Galois field multiplication upon row(i) of PI-corrected block 324. Each multiplier $402g(j)$ receives row(i) of PI-corrected block 324 and a coefficient $g(j)$, e.g., a Galois field coefficient.

Bank 403 includes shift registers $404r1, 404r2, 404r3, \ldots, 404r(N)$ that hold a previous version (k−1) of PO-syndrome data 322 while a next version (k) of PO-syndrome data 322 is being recursively calculated. Such a recursive calculation can be performed by bank 405 of adders $406r1, 406r2, 406r3, \ldots, 406r(N)$. More particularly, adder $406r(j)$ receives a product produced by multiplier $402g(j)$ and row_(j)(k−1) from shift register $404r(j)$, and adds them together (or, in other words, accumulates them) to produce row_(j)(k).

Figure 5:
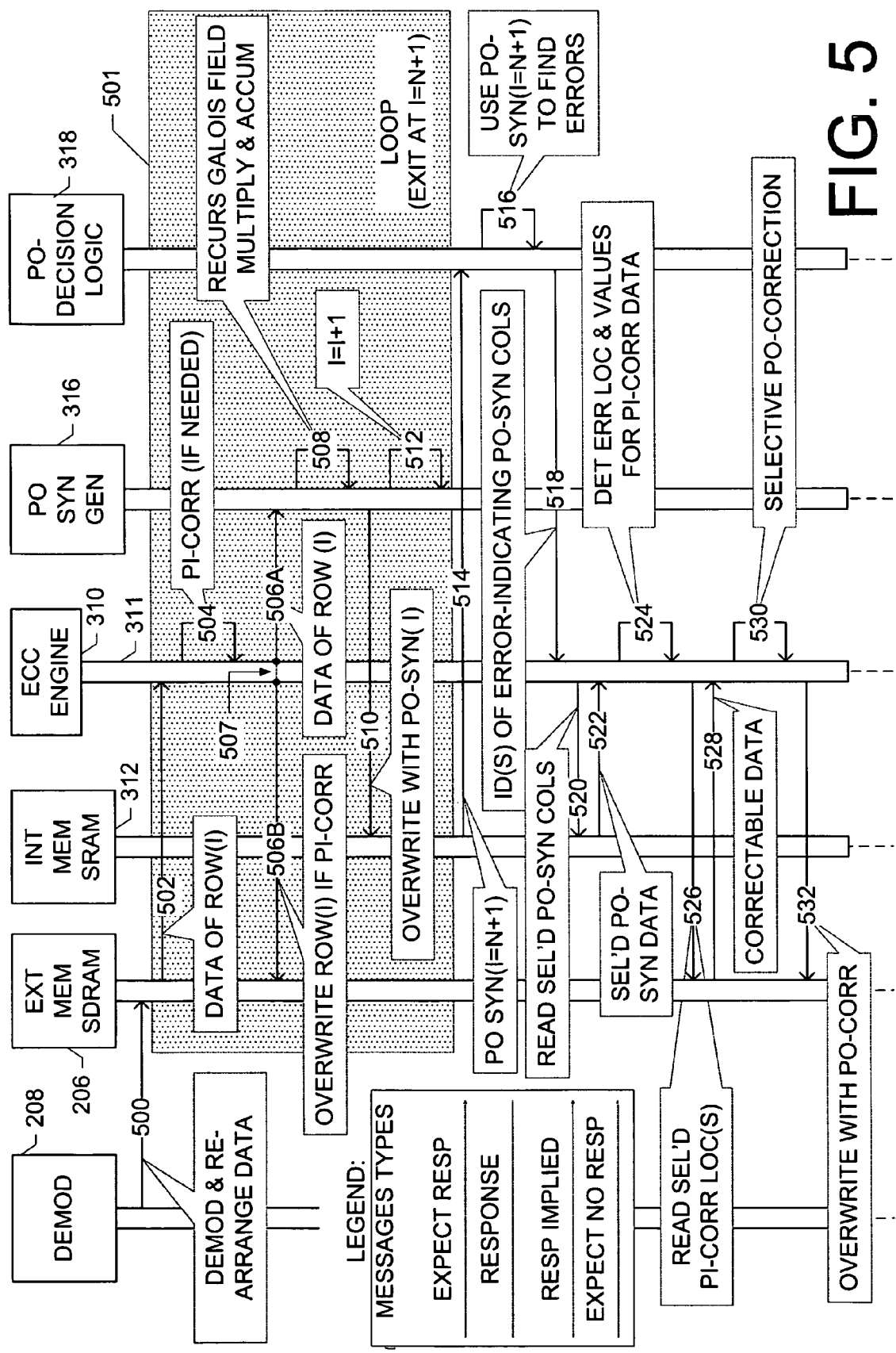
FIG. 5 is a UML-type sequence diagram illustrating an example method for decoding DVD-format data, according to at least one embodiment of the present invention. In a sequence diagram, ⟶ indicates an action that expects a response message. A ⟵ indicates a response message. A ⟶ indicates an action for which the response is implied. And a — indicates an action for which no response is expected.

FIG. 5 is a UML-type sequence diagram that depicts a method for decoding DVD-format data in terms of example interactions between components of FIG. 3A, according to at least one embodiment of the present invention.

At message 500, demodulator 208 reads and demodulates a block of ECC data from DVD 200, and rearranges and then stores the demodulated ECC block in external memory 206. Then loop 501 is entered. Recalling that the demodulated ECC block is treated as an array of rows and columns, a row(i) of the demodulated ECC block in external memory 206 is read by ECC engine 310 at message 502.

At self-message 504, ECC block (via PI-syndrome generator 314) PI-corrects row(i) of the demodulated ECC block, if necessary. PI-errors are the first level of error in the demodulated ECC block, where PO-errors are the second level of errors and uncorrectable errors are the third level of error. The likelihood is great that PI-correction will be needed at message 504. Hence, block 324 of FIG. 3B is labeled as PI-corrected data even though there may be one or more rows that do not require PI-correction.

After message, two messages 506A and 506B can occur substantially simultaneously, as indicated by dashed line 507 connecting the respective message origins on the lifeline 311 of ECC engine 310. At message 506A, ECC engine provides uncorrected/PI-corrected row(i) to PO-syndrome generator 316. If PI-correction of row(i) was performed, then row(i) ECC engine 310 substantially simultaneously overwrites in external memory 206 uncorrected row(i) with PI-corrected row(i) at message 506(B).

At self-message 508, PO-syndrome generator 316 performs the recursive Galois field multiplication and accumulation depicted in FIG. 4. At message 510, PO-syndrome generator 316 (via bank 405 of adders $406r(j)$) overwrites all N rows of version(k−1) of PO-syndrome data 322 with a version(k) thereof. At self-message 512, PO-syndrome generator increments a counter i, e.g., i=l+1. If i=N+1, then loop 501 is exited. In other words, loop 501 represents the recursive calculation by which PO-syndrome data 322 is generated.

At message 514, PO-decision logic 318 reads version (k=N) of PO-syndrome data 322 from internal memory 312.

At self-message 516, PO-decision logic 318 operates upon PO-syndrome data 322 to determine errors remaining in PI-corrected block 324. Treating PO-syndrome data 322 again as an array of rows and columns, PO-decision logic 318 can perform a column-wise inspection of PO-syndrome data 322. If any column has a non-zero value, that indicates the presence of at least one error in the corresponding column of PI-corrected block 324. Such an inspection can be a simple logical ORing of the values in the column, where a non-zero result indicates an errant column.

At message 518, PO-detection logic 318 provides ECC engine 310 with an indication of the error-indicating columns in PO-syndrome data 322. Such an indication can be a 1×N matrix or N bit word, where each element-of-the-matrix/bit-of-the word represents a column of PI-corrected block 324. A non-zero element/bit in the matrix/word can indicate an errant column in PI-corrected block 324.

At message 520, ECC engine 310 requests internal memory 312 to read the errant columns of PO-syndrome data 322. At message 522, internal memory 312 supplies the requested PO-syndrome column data to ECC engine 310. At self-message 524, ECC engine 310 operates upon the selected PO-syndrome column data to identify the corresponding errant columns in the PI-corrected block. More particularly, ECC engine determines the locations of correctable errors, and magnitudes of the differences with respect to the correct values, in PI-corrected block 324.

At message 526, ECC engine 310 requests external memory 206 to read the locations in PI-corrected block 324 identified via self-message 524. At message 528, external memory 206 provides the requested correctable data to ECC engine 310. At self-message 530, ECC engine 310 PO-corrects the correctable data as needed. In other words, at self-message 530, ECC engine 310 selectively corrects only the errant PI-corrected columns to obtain a decoded version of the demodulated ECC block obtained in message 500. As a result, less than all of the columns in the PI-corrected block 324 receive PO-correction.

At message 532, ECC engine overwrites the correctable data in PI-corrected block 324 with the corresponding PO-corrected data. After message 532, external memory 206 holds a decoded version of the demodulated ECC block obtained in message 500.

The dual ECC engine decoder according to the Background Art can be described as performing PO-syndrome generation and PO-correction in parallel (at a rate of 2 blocks/cycle), while DVD-device 302 can be described (given the use of one ECC engine, at the least) as performing PO-correction in series (at a rate of 1 block/cycle). The decoding speed of ECC decoder 304 depends upon the number of PO-errors that need to be corrected. Accordingly, as few as zero PO-errors might exist or up to as many as 182. The number of PO-errors typically present translates to a decoding speed that is about 10% slower than the dual ECC engine decoder according to the Background Art. The savings in the footprint size of ECC decoder 304 is a significant advantage relative to the dual ECC engine decoder according to the Background Art, one that is only slightly diminished by the 10% slower decoding speed.

In addition to requiring one fewer ECC engine, use of PO-decision logic 318 makes it possible for ECC decoder 304 to operate with a reduced size of internal memory 312 (e.g., 3 K bytes) as contrasted with the size (e.g., 6 K bytes) of the internal memory according to the dual ECC engine decoder according to the Background Art.

Of course, although several variances and example embodiments of the present invention are discussed herein, it is readily understood by those of ordinary skill in the art that various additional modifications may also be made to the present invention. Accordingly, the example embodiments discussed herein are not limiting of the present invention.

What is claimed is:

1. A method of decoding DVD-format data, the method comprising:
   receiving a demodulated error correction code (ECC) block of DVD-format data;
   parity-of-inner-code-correcting (PI-correcting) the demodulated ECC block as needed;
   identifying any errant column within the PI-corrected block which merits parity-of-outer code (PO) correction based on a current PO syndrome, the current PO syndrome being generated based on a previous PO syndrome and the PI-corrected block, the PI-corrected block being an array of rows and columns; and
   selectively PO-correcting only the errant PI-corrected columns to obtain a decoded version of ECC block.

2. The method of claim 1, wherein the step of selectively PO-correcting results in less than all of the PI-corrected block being PO-corrected.

3. The method of claim 1, wherein:
   the step of PI-correcting makes correction as-needed on a row-by-row basis;
   the method further comprising:
       treating the demodulated ECC block as an array of rows and columns; and
       iterating the step of PI-correcting in order to PI-correct portions of the entire demodulated ECC block in need thereof.

4. The method of claim 3, further comprising:
   overwriting, if a PI-corrected row is produced, the corresponding data of the demodulated ECC block with the data of the PI-corrected row.

5. The method of claim 1, wherein the step of identifying any errant column includes:
   generating a PO syndrome as the current PO syndrome based upon the PI-corrected block and the previous PO syndrome; and
   recognizing any errant column within the PI-corrected block based upon the PO syndrome.

6. The method of claim 5, wherein:
   the step of PI-correcting makes correction as-needed on a row-by-row basis; and
   the method further comprises:
       treating the demodulated ECC block as an array of rows and columns;
       iterating the step of PI-correcting in order to PI-correct portions of the entire demodulated ECC block in need thereof; and
       iterating the step of generating a PO-syndrome in order to successively revise the current PO-syndrome for each row of PI-corrected data that is produced or the corresponding row of the demodulated ECC block if PI-correction thereof was not needed.

7. The method of claim 6, further comprising:
   overwriting, if a PI-corrected row is produced, the corresponding data of the demodulated ECC block with the data of the PI-corrected row; and
   wherein the step of generating a PO-syndrome is iterated at substantially the same time as the overwriting occurs.

8. The method of claim 5, further comprising:
   iterating the step of generating a PO-syndrome in order to successively revise the current PO-syndrome for each row in the array of PI-corrected data.

9. The method of claim 5, wherein an $i^{th}$ iteration of the step of generating a PO-syndrome includes:
   multiplying an $i^{th}$ row of the PI-corrected block with a set of coefficients to produce a product;
   recursively forming a current version v(k) of the current PO-syndrome by adding the product to a previous version v(k−1) of the current PO-syndrome.

10. The method of claim 9, wherein the set of coefficients are Galois-field coefficients and the multiplying is Galois-field multiplication.

11. The method of claim 5, further comprising:
   treating the current PO-syndrome as an array of rows and columns;
   wherein the step of recognizing includes
      detecting whether there are any non-zero columns within the current PO-syndrome, where such a non-zero column has one or more non-zero entries, and
      treating as errant any column in the PI-corrected block that corresponds to a non-zero column in the current PO-syndrome.

12. A method of decoding DVD-format data, the method comprising:
   receiving a demodulated error correction code (ECC) block of DVD-format data;
   parity-of-inner-code-correcting (PI-correcting) the demodulated ECC block as needed;
   identifying any errant column within the PI-corrected block which merits PO-correction, the identifying including,
      treating the PI-corrected block as an array of rows and columns,
      generating a parity-of-outer code (PO) syndrome based upon the PI-corrected block, and
      recognizing any errant column within the PI-corrected block based upon the PO syndrome;
   selectively PO-correcting only the errant PI-corrected columns to obtain a decoded version of ECC block;
   treating the demodulated ECC block as an array of rows and columns; and
   initializing values of a version v(0) of a PO syndrome;
   the step of PI-correcting and the step of generating a PO-syndrome are concurrently accomplished by iteratively performing the following on a row by row basis for i=1 to N, where N is the number of rows in the demodulated ECC block,
      PI-correcting row(i) of the demodulated ECC block to produce corrected PI data PI_CORR_row(i) and
      forming a $k^{th}$ version of the PO-syndrome PO_syndrome_v(k) as a function of PI_CORR_line(i) and a previous version of the PO-syndrome PO_syndrome_v(k−1).

13. The method of claim 12, wherein a $k^{th}$ iteration of the step of generating a PO-syndrome includes:
   multiplying an $i^{th}$ row of the PI-corrected block with a set of coefficients to produce a product;
   recursively forming current PO syndrome PO-syndrome_v(k) by adding the product to the previous PO syndrome PO-syndrome_v(k−1).

14. The method of claim 13, wherein the set of coefficients are Galois-field coefficients and the multiplying is Galois-field multiplication.

15. A method of decoding DVD-format data, the method comprising:
   receiving a demodulated error correction code (ECC) block of DVD-format data;
   using an ECC engine to parity-of-inner-code-correct (PI-correct) the demodulated ECC block as needed; and
   using the same ECC engine to selectively parity-of-outer code (PO) correct less than all of the PI-corrected block based on a current PO syndrome, the current PO syndrome being generated based on a previous PO syndrome and the PI-corrected block, the PI-corrected block being an array of rows and columns.

16. The method of claim 15, wherein the PO-correction includes:
   selectively PO-correcting only those columns in the PI-corrected block that exhibit at least one error.

17. The method of claim 15, wherein the step of using an ECC engine to PO-correct includes
   generating a PO syndrome as the current PO syndrome based upon the PI-corrected block and the previous PO syndrome, and
   recognizing any errant column within the PI-corrected block based upon the current PO syndrome.

18. The method of claim 17, wherein:
   the step of using an ECC engine to PI-correct includes
      PI-correcting as-needed on a row-by-row basis, and
      iterating the step of PI-correcting in order to PI-correct portions of the entire demodulated ECC block in need thereof; and
   the step of using an ECC engine to PO-correct includes
      iterating the step of generating a PO-syndrome in order to successively revise the current PO-syndrome for each row of PI-corrected data that is produced or the corresponding row of the demodulated ECC block if PI-correction thereof was not needed.

19. An apparatus for decoding DVD-format data, the apparatus comprising:
   an external memory in which is stored a demodulated error correction code (ECC) block of DVD-format data;
   an ECC engine to PI-correct the demodulated ECC block as needed; and
   parity-of-outer code decision (PO-decision) logic to
      indicate any errant column within the PI-corrected block which merits parity-of-outer code (PO) correction based on a current PO syndrome, the current PO syndrome being generated based on a previous PO syndrome and the PI-corrected block, the PI-corrected block being an array of rows and columns, and
      selectively cause the ECC engine to PO-correct only the errant PI-corrected columns in order to obtain a decoded version of ECC block.

20. The apparatus of claim 19, wherein the PO decision logic is further operable to cause less than all of the PI-corrected block to be PO-corrected.

21. The apparatus of claim 19, wherein:
   the demodulated ECC block is treated as an array of rows and columns; and
   the ECC engine is further operable to make PI-correction as-needed iteratively on a row-by-row basis.

22. The apparatus of claim 21, wherein the ECC engine is further operable to overwrite, if a PI-corrected row is produced, the corresponding data of the demodulated ECC block with the data of the PI-corrected row.

23. The apparatus of claim 19, further comprising:
   an internal memory;
   wherein the ECC engine includes a PO syndrome generator operable to generate a PO syndrome as the current PO-syndrome based upon the PI-corrected block and the previous PO syndrome, and operable to store the PO-syndrome in the internal memory.

24. The apparatus of claim 23, wherein:
   the ECC engine is further operable to make PI-correction as-needed on a row-by-row basis; and the PO syndrome generator is further operable to iteratively generate the PO syndrome in order to successively revise the current PO-syndrome for each row of PI-corrected data that is produced by the ECC engine or the corresponding row of the demodulated ECC block if PI-correction thereof was not needed.

25. The apparatus of claim 24, wherein:
the ECC engine is further operable to overwrite, if a PI-corrected row is produced, the corresponding data of the demodulated ECC block with the data of the PI-corrected row; and
the PO syndrome generator is further operable to iterate the generation of the PO syndrome to occur at substantially the same time that the overwriting occurs.

26. The apparatus of claim 23, wherein:
the demodulated ECC block is treated as an array of rows and columns;
the PO syndrome generator is further operable to initialize values of a version v(0) of a PO syndrome; and
the ECC engine and the PO syndrome generator are further cooperatively operable to iteratively perform the following on a row by row basis for i=1 to N, where N is the number of rows in the demodulated ECC block,
the ECC engine PI-correcting row(i) of the demodulated ECC block as-needed to produce corrected PI data PI_CORR_row(i) and
the PO syndrome generator forming a $k^{th}$ version of the current PO-syndrome PO_syndrome_v(k) as a function of previous PO syndrome PO_syndrome_v(k−1) and PI_CORR_line(i) or the corresponding row of the demodulated ECC block if PI-correction thereof was not needed.

27. The apparatus of claim 26, wherein, for an $i^{th}$ iteration, the PO syndrome generator is further operable to:
multiply an $i^{th}$ row of the PI-corrected block with a set of coefficients to produce a product;
recursively form a current version v(k) of the current PO-syndrome by adding the product to a previous version v(k−1) of the current PO-syndrome.

28. The apparatus of claim 27, wherein the set of coefficients are Galois-field coefficients and the multiplying is Galois-field multiplication.

29. The apparatus of claim 23, wherein the PO syndrome generator is iteratively operable such that an $i^{th}$ iteration includes:
multiplying an $i^{th}$ row of the PI-corrected block with a set of coefficients to produce a product;
recursively forming a current version v(k) of the current PO-syndrome by adding the product to a previous version v(k−1) of the current PO-syndrome.

30. The apparatus of claim 29, wherein the set of coefficients are Galois-field coefficients and the multiplying is Galois-field multiplication.

31. The apparatus of claim 23, wherein:
the PO-syndrome is treated as an array of rows and columns; and
the PO-decision logic is further operable to
detect whether there are any non-zero columns within the PO-syndrome, where such a non-zero column has one or more non-zero entries, and
treat as errant any column in the PI-corrected block that corresponds to a non-zero column in the PO-syndrome.

32. An apparatus for decoding DVD-format data, the apparatus comprising:
an external memory in which is stored a demodulated error correction code (ECC) block of DVD-format data;
an ECC engine operable to PI-correct the demodulated ECC block as needed, and
parity-of-outer code (PO) decision logic to selectively cause the ECC engine to PO-correct less than all of the PI-corrected block based on a current PO syndrome, the current PO syndrome being generated based on a previous PO syndrome and the PI-corrected block, the PI-corrected block being an array of rows and columns.

33. The apparatus of claim 32, wherein the PO decision logic is further operable to selectively PO-correct only those columns in the PI-corrected block that exhibit at least one error.

34. The apparatus of claim 32, wherein the PO decision logic is further operable to:
generate a parity-of-outer code (PO) syndrome as the current PO syndrome based upon the PI-corrected block and the previous PO syndrome, and
recognize any errant column within the PI-corrected block based upon the current PO syndrome.

35. The apparatus of claim 34, wherein:
the ECC engine is further operable to PI-correct as-needed on a row-by-row basis; and
the PO decision logic is further operable to
iteratively generate a PO-syndrome in order to successively revise the current PO-syndrome for each row of PI-corrected data that is produced by the ECC engine or the corresponding row of the demodulated ECC block if PI-correction thereof was not needed.

36. An apparatus for decoding DVD-format data, the method comprising:
means for receiving a demodulated error correction code (ECC) block of DVD-format data;
means for parity-of-inner-code-correcting (PI-correcting) the demodulated ECC block as needed;
means for identifying any errant column within the PI-corrected block which merits parity-of-outer code (PO) correction based on a current PO syndrome, the current PO syndrome being generated based on a previous PO syndrome and the PI-corrected block, the PI-corrected block being an array of rows and columns; and
means for selectively PO-correcting only the errant PI-corrected columns to obtain a decoded version of ECC block.

* * * * *